United States Patent
Raymond

(10) Patent No.: US 10,150,222 B2
(45) Date of Patent: *Dec. 11, 2018

(54) MULTI-TOOL ASSEMBLY

(71) Applicant: Daniel J. Raymond, Saginaw, MI (US)

(72) Inventor: Daniel J. Raymond, Saginaw, MI (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/169,052

(22) Filed: May 31, 2016

(65) Prior Publication Data

US 2017/0028572 A1   Feb. 2, 2017

Related U.S. Application Data

(63) Continuation-in-part of application No. 14/497,108, filed on Sep. 25, 2014.

(60) Provisional application No. 61/882,187, filed on Sep. 25, 2013, provisional application No. 62/167,663, filed on May 28, 2015.

(51) Int. Cl.
  *B26B 11/00* (2006.01)
  *G01V 3/08* (2006.01)
  *B43L 9/04* (2006.01)

(52) U.S. Cl.
  CPC ............. *B26B 11/00* (2013.01); *B43L 9/04* (2013.01); *G01V 3/08* (2013.01)

(58) Field of Classification Search
  CPC ............. B26B 11/00; B43L 9/04; G01V 3/08
  USPC .......................................................... 7/160
  See application file for complete search history.

(56) References Cited

U.S. PATENT DOCUMENTS

| | | | | |
|---|---|---|---|---|
| 164,575 | A * | 6/1875 | McCall ................. | B26B 5/001 30/162 |
| 4,898,053 | A * | 2/1990 | Russo .................... | B25B 23/12 81/125 |
| 5,426,802 | A * | 6/1995 | Greenwood ........... | B26B 29/06 7/163 |
| 5,513,405 | A * | 5/1996 | Bradbury, Jr. ........... | B26B 5/00 30/123 |
| 6,298,562 | B1 * | 10/2001 | Duquette ............... | B26B 11/00 30/162 |
| 6,938,345 | B2 * | 9/2005 | Yu ......................... | B23D 61/12 30/122 |
| 7,530,131 | B1 * | 5/2009 | Conrique ............... | B25F 1/04 7/158 |
| 8,191,192 | B1 * | 6/2012 | Barker .................... | B26B 5/002 7/158 |
| 2005/0160853 | A1 * | 7/2005 | Sasano ................... | A63H 27/04 74/421 A |
| 2007/0234483 | A1 * | 10/2007 | Kunz ....................... | B25D 1/00 7/143 |

(Continued)

*Primary Examiner* — Hadi Shakeri
(74) *Attorney, Agent, or Firm* — Dickinson Wright PLLC

(57) ABSTRACT

The multi-tool assembly includes a housing which is made of two pieces that are joined together with a screw. The housing extends between opposite longitudinal ends and has opposite lateral sides which extend between the longitudinal ends. The assembly also includes a blade which extends out of one of the longitudinal ends of the housing. At least one spirit level is attached with the housing and is oriented either perpendicular or parallel to at least one of the lateral sides. The blade allows a person to use the multi-tool assembly as a utility knife, and the orientation of the lateral side in parallel with or perpendicular to the spirit level allows a user to use the multi-tool assembly as a torpedo level.

8 Claims, 4 Drawing Sheets

(56) References Cited

U.S. PATENT DOCUMENTS

2008/0256816 A1\* 10/2008 Cosentino ............... B26B 5/001
33/760

\* cited by examiner

MULTI-TOOL ASSEMBLY

CROSS-REFERENCE TO RELATED APPLICATIONS

This application is a Continuation-In-Part Application of co-pending U.S. patent application Ser. No. 14/497,108, filed on Sep. 25, 2014, which claims priority to U.S. Provisional Application Serial No. 61/882,187, filed on September 25, 2013, and this application also claims priority to U.S. Provisional Patent Application Ser. No. 62/167,663, filed on May 28, 2015.

BACKGROUND OF THE INVENTION

1. Field of the Invention

The present invention is related to hand-held multi-tool assemblies.

2. Related Art

People who work with drywall often make patterns on drywall panels and then cut through the drywall along the drawn patterns. As such, most drywall workers carry both a pencil (or a pen or any other writing utensil) and a utility knife and regularly switch between these two tools. Such drywall workers may also carry additional tools including, for example, a Phillips or flat head screw driver and a drywall/jab saw. In addition to the time required to switch between these two or more objects, the repeated processes of taking out and putting away the utility knife with its sharp blade could potentially be dangerous.

SUMMARY OF THE INVENTION AND ADVANTAGES

One aspect of the present invention is related to a multi-tool assembly that is particularly suited for use in the drywall business. The multi-tool assembly includes a housing which is made of two pieces that are joined together with a screw. The housing extends between opposite longitudinal ends and has opposite lateral sides which extend between the longitudinal ends. The assembly also includes a blade which extends out of one of the longitudinal ends of the housing. At least one spirit level is attached with the housing and is oriented either perpendicular or parallel to at least one of the lateral sides. The blade allows a person to use the multi-tool assembly as a utility knife, and the orientation of the lateral side in parallel with or perpendicular to the spirit level allows a user to use the multi-tool assembly as a torpedo level.

According to another aspect of the present invention, the multi-tool assembly further includes a magnet which allows the multi-tool assembly to function as a stud finder.

According to yet another aspect of the present invention, the magnet is incorporated into a head of the screw.

According to still another aspect of the present invention, the multi-tool assembly further includes a laser head which is oriented perpendicular to the at least one spirit level for allowing the multi-tool assembly to function as a stud indicator by attaching the multi-tool assembly to a drywall panel with a magnetic attraction force between the magnet and the stud and orienting the laser head in a parallel direction by using the at least one spirit level.

According to a further aspect of the present invention, the laser head is configured to project a spread laser beam.

According to yet a further aspect of the present invention, the laser head is disposed adjacent one of the longitudinal ends of the housing.

According to still another aspect of the present invention, the at least one spirit level is a pair of spirit levels that are oriented perpendicularly to one another.

According to another aspect of the present invention, the lateral sides are parallel with one another and are parallel with one of the spirit levels and perpendicular to the other spirit level.

According to yet another aspect of the present invention, the housing has a slot which opens to the longitudinal end of the housing opposite of the blade.

According to still another aspect of the present invention, the slot is shaped to receive a carpenter pencil.

According to a further aspect of the present invention, the screw extends through the housing to a point, and the multi-tool assembly includes a plurality of recesses that are formed into one of the lateral sides of the housing for holding the carpenter pencil to use the multi-tool assembly to draw circles.

According to yet a further aspect of the present invention, the multi-tool assembly further includes a set screw that extends into the slot for engaging the carpenter pencil to retain the carpenter pencil in the slot.

BRIEF DESCRIPTION OF THE DRAWINGS

These and other features and advantages of the present invention will be readily appreciated as the same becomes better understood by reference to the following detailed description in connection with the accompanying drawings wherein.

DESCRIPTION OF THE ENABLING EMBODIMENT

Figure 1:
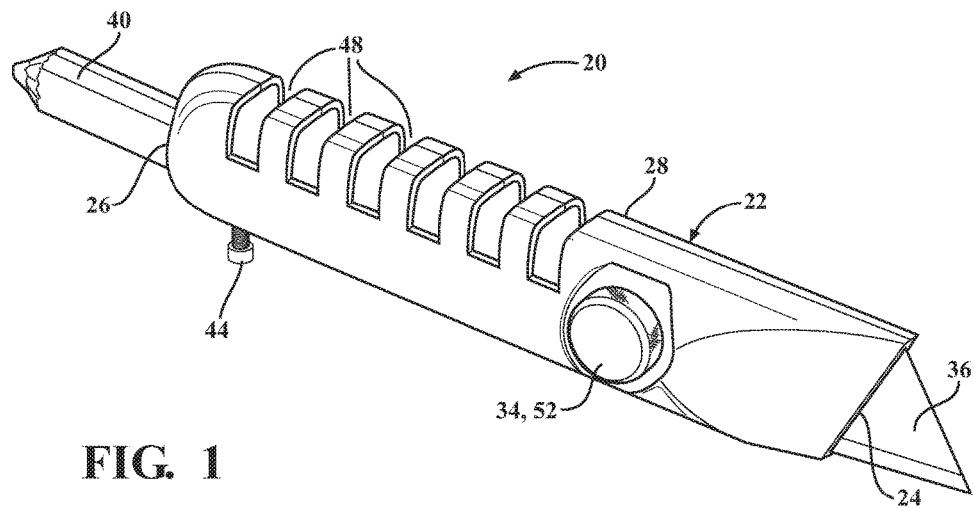
FIG. 1 is a perspective and elevation view of an exemplary embodiment of a multi-tool assembly constructed according to an aspect of the present invention.

Referring to the Figures, wherein like numerals indicate corresponding parts throughout the several views, a first exemplary embodiment of an improved hand-held multi-tool assembly 20 is generally shown in FIG. 1. As will be appreciated from the following description, the multi-tool assembly 20 may be manufactured at a low cost and includes a multitude of different features arranged in a particular way for performing a number of different tasks including, for example, drawing patterns (including circular patterns) on drywall patterns, cutting drywall, finding studs behind drywall panels, leveling objects, and guiding drywall workers on where to screw the drywall panels to studs.

The exemplary embodiment of the multi-tool assembly 20 includes a housing 22 which is made of two cover pieces that are separately formed and joined together along their outer peripheries. The housing 22 is generally rectangular in shape and extends in a longitudinal direction between opposite first and second longitudinal ends 24, 26. The housing 22 also has a pair of spaced apart and parallel lateral sides 28; a front surface 30; and a back surface 32. The two pieces of the housing 22 are joined together via a screw 34 which extends through one of the pieces and threadedly engages the other piece. Between the cover pieces, the housing 22 has an open interior which can store spare razor blades. The cover pieces may be made of any suitable material (for example, plastic, nylon, metal, etc.) and may be shaped through any suitable process.

A first tool of the multi-tool assembly 20 is a utility blade 36, which is partially disposed within the open interior of the housing 22 and extends through the first longitudinal end 24 to allow the multi-tool assembly 20. The multi-tool assembly 20 may include an optional retraction mechanism (not shown) for manually retracting the blade into and out of the interior of the housing 22.

Figure 2:
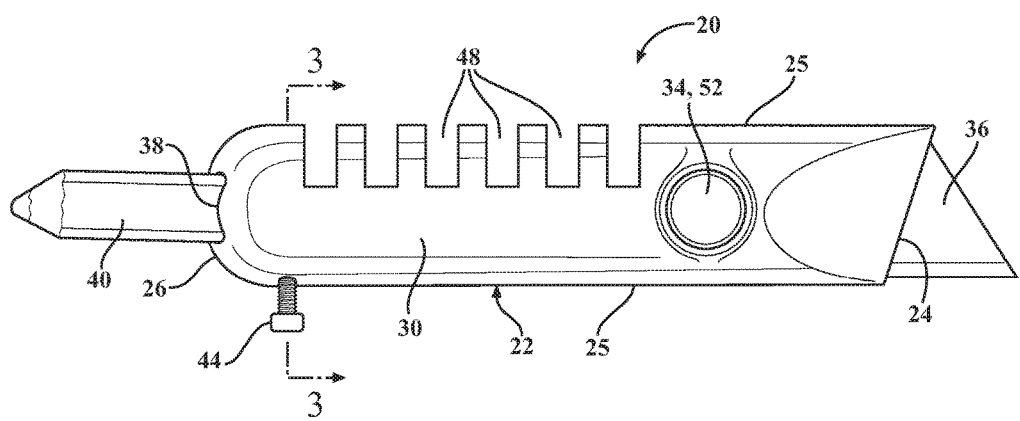
FIG. 2 is a front elevation view of the multi-tool assembly of FIG. 1.
Figure 3:
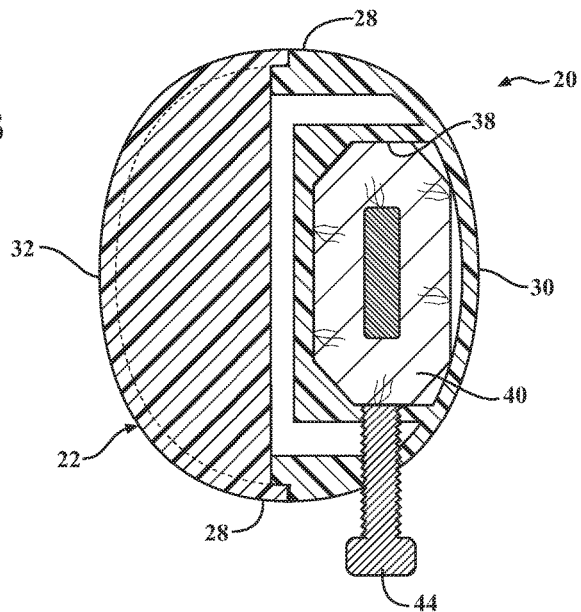
FIG. 3 a cross-sectional view of the multi-tool assembly of FIG. 1.
Figure 4:
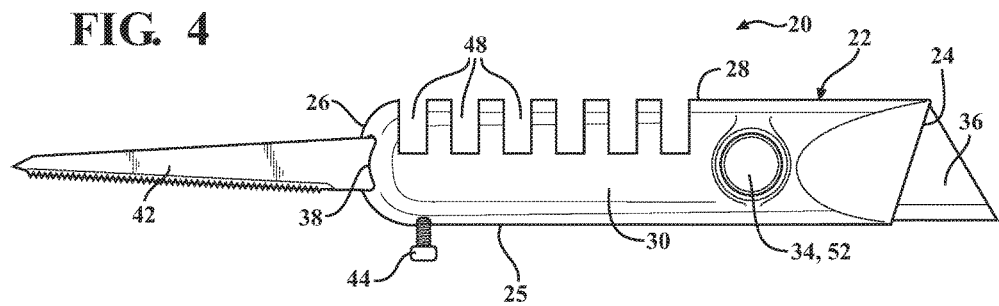
FIG. 4 is a front elevation view of the multi-tool assembly with a saw as a second tool.

On the second longitudinal end 26, the housing 22 has a slot 38 which is open for receiving a second tool, such as a carpenter pencil 40 (as shown in FIGS. 1-3) or a saw 42 (as shown in FIG. 4). As shown in FIG. 3, the slot 38 is integrally formed entirely within one of the cover pieces of the housing 22 and has an eight sided shape that matches the shape of a conventional carpenter pencil 40. With a carpenter pencil 40 received within the slot 38, this allows for new and expected results, particularly in the field of drywall work. Specifically, a drywall worker can use the carpenter pencil 40 to draw a pattern on a drywall sheet and then flip the multi-tool assembly 20 around to make a cut along that pattern with the blade 36. This is far more efficient than using a separate pencil, putting down the pencil, finding a utility knife, picking up the utility knife and then cutting along the pattern. Any tool with a receiving portion that matches the geometry of the slot 38 may be inserted into the slot 38 including, for example, a Phillips head screwdriver bit or flat head screwdriver bit. The slot 38 preferably extends approximately halfway between the longitudinal ends 24, 26 of the housing 22 to provide a very secure connection between the second tool received in the slot 38 and the housing 22 with very little slop, thereby allowing for increased precision when using the second tool.

The multi-tool assembly 20 further includes at least one tool engaging element for releasably securing the second tool within the slot 38. In the exemplary embodiment, the tool engaging element is a set screw 44 which extends through one of the sides of the housing 22. Rotating the set screw 44 in one direction tightens the engagement with the secondary tool by pressing the set screw 44 against the secondary tool, and rotating the set screw 44 in the opposite direction releases the engagement with the second tool to allow for replacement of the secondary tool. FIG. 3 shows the set screw 44 threaded into an engaged position in contact with a carpenter pencil 40. In the exemplary embodiment, the set screw 44 has an oversized head to allow a user to manually thread the set screw 44 by hand and without any special tools. When the second tool is a carpenter pencil 40, this configuration is particularly advantageous because it allows the position of the carpenter pencil 40 within the slot 38 to be quickly adjusted as the carpenter pencil 40 wears.

Figure 5:
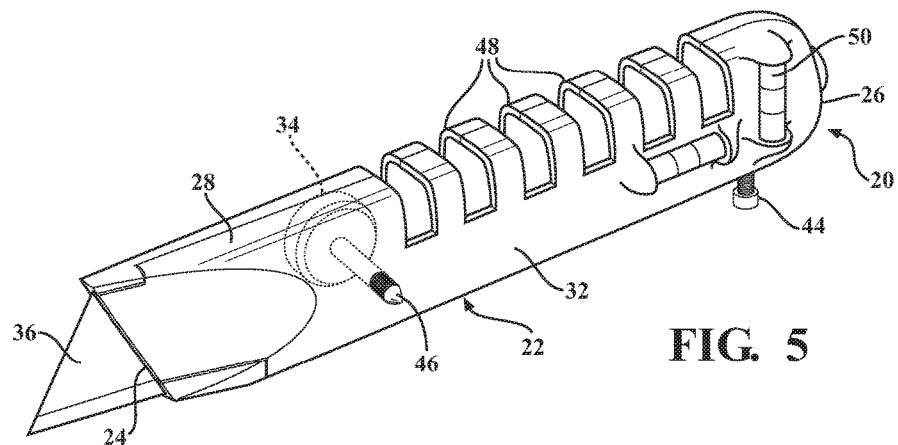
FIG. 5 is a back elevation view of the multi-tool assembly of FIG. 1.

A third tool of the multi-tool assembly 20 is a compass for drawing circular patterns on a drywall panel. Specifically, as shown in FIG. 5, the screw 34 which joins the two cover pieces of the housing 22 together extends through the housing 22 and presents a point 46 for placement on a drywall sheet to allow the housing 22 to be rotated about the screw 34. The housing 22 further includes a plurality of recesses 48 that are shaped to releasably hold the carpenter pencil 40 in a direction parallel to the screw 34. The recesses 48 are formed into one of the lateral sides 28 of the housing 22 and are spaced longitudinally from one another and from the screw 34 by predetermined distances, such as one half of an inch (½") between adjacent recesses 48. In use, the distances between the respective recesses 48 and the center of the screw 34 will define the radius of the circles being drawn. This feature is particularly advantageous because a worker may very quickly draw a circle with a predetermined diameter (determined by which recess 48 the carpenter pencil 40 is inserted into) and then use the blade 36 to cut along that pattern. Cutting circular patterns are particularly common in the drywall industry, and thus, this feature of the multi-tool assembly 20 is particularly suited for drywall workers but may find uses in a range of different applications.

Referring still to FIG. 5, a fourth tool of the multi-tool assembly 20 is a level for measuring levelness in objects. The housing includes a pair of spirit levels 50 (also known as bubble levels) which which are incorporated into the housing 22 for allowing the multi-tool assembly 20 to function as a torpedo level. The spirit levels 50 are oriented perpendicularly relative to one another to form a T-shape. That is, one of the spirit levels 50 extends lengthwise in parallel with the lateral sides 28 and the other spirit level 50 extends widthwise perpendicularly to the lateral sides 28. The parallel lateral sides 28 of the housing 22 allow a user to place the multi-tool assembly 20 against an object and gauge its vertical or horizontal levelness using the spirit levels 50.

A fifth tool of the multi-tool assembly 20 is a stud finder. To function as a stud finder, a magnet 52 is incorporated into the head of the screw 34 which attaches the two cover pieces of the housing 22 together. The magnet 52 is preferably recessed within the screw 34 and may be fixedly attached with the screw 34 through any suitable means, e.g., over-molding, an adhesive, mechanical deformation, etc. The magnet 52 is of sufficient force to allow the magnet 51 to be magnetically attracted to the metal studs commonly found in commercial and industrial buildings and also to detect nails or screws which bind the drywall panels with wooden studs in residential applications.

Figure 6:
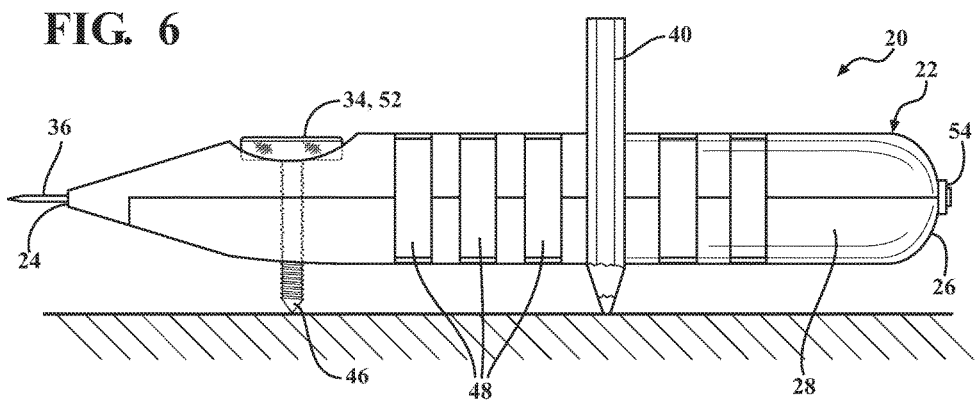
FIG. 6 is an elevation view of a drywall worker using the multi-tool assembly of FIG. 1 as a stud indicator.
Figure 7:
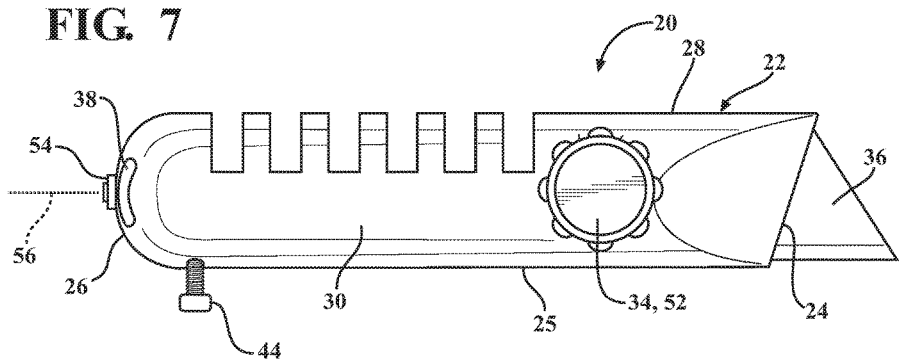
FIG. 7 front elevation view of an alternate embodiment of the multi-tool assembly.
Figure 8:
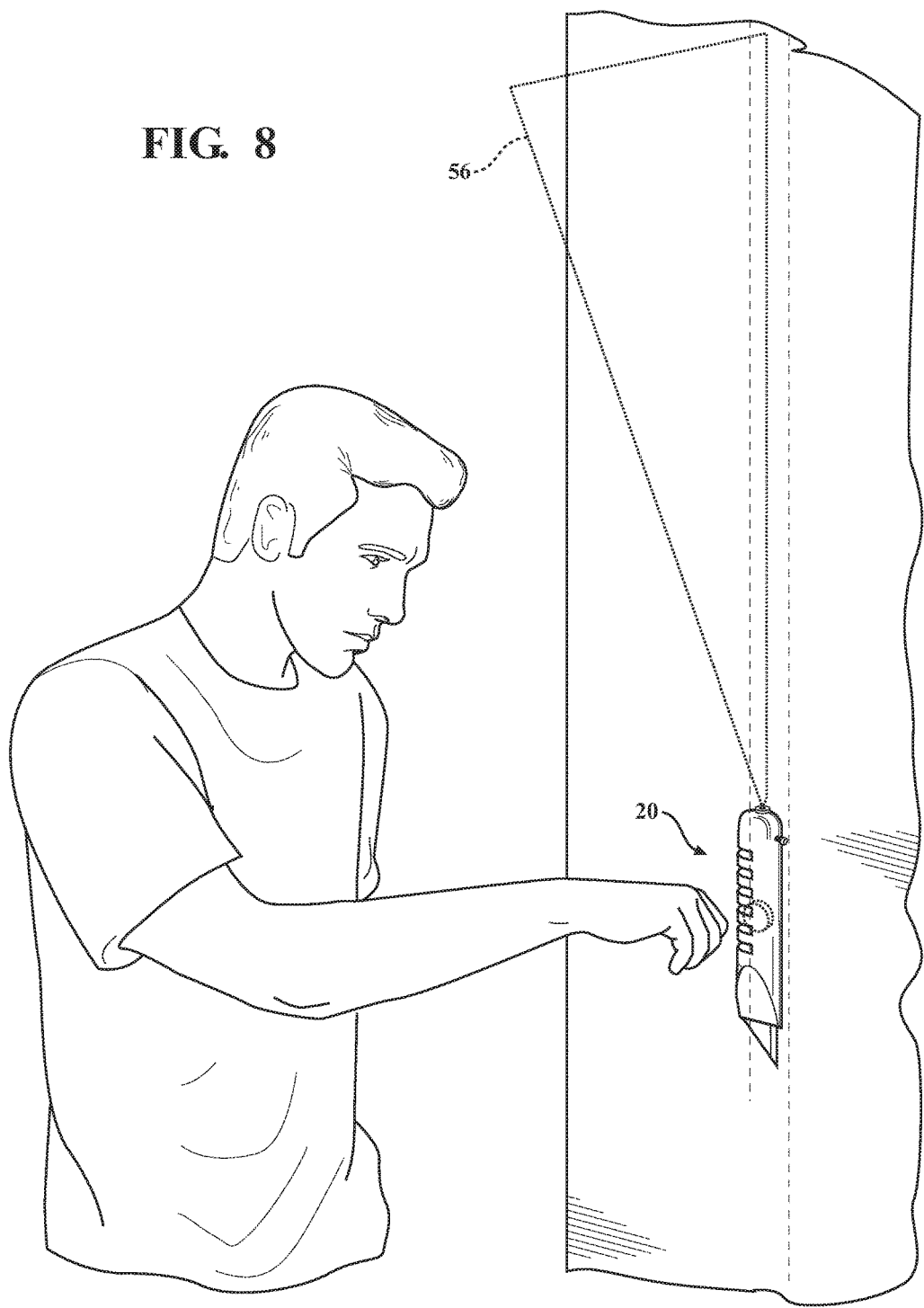
FIG. 8 is a perspective elevation view showing the multi-tool assembly of FIG. 7 being used as a stud finder.

Referring now to FIGS. 5 and 6, a sixth tool of the multi-tool assembly 20 is as a stud indicator for visually showing a drywall worker where a stud is located behind a drywall panel so he or she can more easily screw the drywall panel to the stud. The magnet 52 is of sufficient force to hold the weight of the multi-tool assembly 20 through the magnetic attraction between the magnet 52 in the multi-tool assembly 20 and the stud behind a drywall panel. The multi-tool assembly 20 also includes a laser head 54 positioned adjacent the blade 36 and configured to project a spread laser beam 56. In a direction parallel to the lateral sides 28 of the housing 22.

To use the multi-tool assembly 20 as a stud indicator, a drywall worker first uses turns on the laser head 54, then attaches the multi-tool assembly 20 with a drywall panel in a location of a stud through a magnetic attraction force between the magnet 52 and the stud. The drywall worker then rotates the multi-tool assembly 20 into a vertical configuration using the appropriate spirit level 50, which will orient the laser beam 56 along the vertical stud. The drywall worker can then confidently use the laser beam 56 as a guide for where to screw the drywall panel to the stud.

Obviously, many modifications and variations of the present invention are possible in light of the above teachings and may be practiced otherwise than as specifically described while within the scope of the appended claims.

What is claimed is:

1. A multi-tool assembly, comprising:
a housing made of two pieces that are joined together with a screw, said housing extending between opposite longitudinal ends, and said housing having opposite lateral sides which extend between said longitudinal ends;
a blade extending out of one of said longitudinal ends of said housing;
at least one spirit level attached with said housing and oriented either perpendicular or parallel to at least one of said lateral sides;
said housing further having a slot which opens to the longitudinal end opposite of said blade and which is shaped to receive a carpenter pencil;
said housing further including a plurality of spaced apart recesses formed into one of said lateral sides and spaced from one another for holding the carpenter pencil; and
said screw extending through said housing to a point.

2. The multi-tool assembly as set forth in claim 1 further including a magnet.

3. The multi-tool assembly as set forth in claim 2 wherein said magnet is incorporated into a head of said screw.

4. The multi-tool assembly as set forth in claim 3 further including a laser head oriented perpendicularly relative to said at least one spirit level.

5. The multi-tool assembly as set forth in claim 4 wherein said laser head is configured to project a spread laser beam.

6. The multi-tool assembly as set forth in claim 3 wherein said laser head is disposed adjacent one of said longitudinal ends of said housing.

7. The multi-tool assembly as set forth in claim 1 wherein said at least one spirit level is a pair of spirit levels oriented perpendicularly to one another.

8. The multi-tool assembly as set forth in claim 7 wherein said lateral sides are in parallel with one another and in parallel with one of said spirit levels and perpendicular to the other of said spirit levels.

* * * * *